United States Patent [19]

Lawlor

[11] 3,725,677

[45] Apr. 3, 1973

[54] COMPUTER UTILIZING RANDOM PULSE TRAINS

[76] Inventor: Reed C. Lawlor, 412 W. Sixth St., Los Angeles, Calif. 90014

[22] Filed: Mar. 24, 1971

[21] Appl. No.: 127,633

Related U.S. Application Data

[62] Division of Ser. No. 742,619, July 5, 1968, Pat. No. 3,612,845.

[52] U.S. Cl. ............... 307/260, 235/194, 307/218, 307/269, 328/59, 328/63, 331/78
[51] Int. Cl. ................................................ H03k 5/00
[58] Field of Search ...... 235/194; 307/218, 235, 237, 307/240, 269, 260, 262, 264; 328/150, 151, 160, 59–63; 331/78

[56] References Cited

UNITED STATES PATENTS

| | | | |
|---|---|---|---|
| 3,407,291 | 10/1968 | Thistle | 235/183 |
| 3,304,515 | 2/1967 | Stieler | 331/78 |
| 3,054,068 | 9/1962 | De Jong | 307/237 X |
| 2,773,186 | 12/1956 | Hermann, Jr. | 331/78 X |
| 3,304,504 | 2/1967 | Horlander | 307/269 X |
| 3,510,772 | 5/1970 | Luthi | 235/194 X |
| 3,525,042 | 8/1970 | Nunlist et al. | 235/194 X |
| 3,525,861 | 8/1970 | Alexander | 235/194 X |

OTHER PUBLICATIONS

"Noise Computer," Quarterly Technical Progress Reports, University of Illinois, [Jan., Feb., Mar. 1965]

*Primary Examiner*—Stanley D. Miller, Jr.

[57] ABSTRACT

Noise signals from a diode and clock pulses from a clock pulse source are fed to input legs of a logic circuit such as an AND gate, causing pulses of variable amplitude to appear in the output of the circuit. A threshold circuit suppresses pulses having amplitudes below a predetermined level. The remaining pulses trigger a univibrator thus causing pulses to be generated at random times in synchronous with clock pulses thereby forming a train of synchronous random pulses. Trains of random pulses from several such random pulse generators are fed to logic circuits to perform arithmetic operations, such as multiplication.

15 Claims, 4 Drawing Figures

INVENTOR.
Reed C. Lawlor

COMPUTER UTILIZING RANDOM PULSE TRAINS

CROSS REFERENCES TO RELATES APPLICATIONS

This application is a division of my copending application Ser. No. 742,619 filed July 5, 1968, now U.S. Pat. No. 3,612,845.

This invention relates to a computing system which utilizes trains of randomly occurring pulses to represent numbers that are to be processed mathematically.

This invention makes use of a plurality of random pulse generators together with means for processing pulses from the various generators to produce a signal that has an average frequency that bears a predetermined mathematical relation to the average frequencies of pulses from the respective random pulse generators.

Each random pulse generator generates pulses at an average rate, or frequency, proportional to the number to be processed. The pulses are produced by the combined action of pulse source and a noise source which generates a noise signal of variable amplitude. The number represented by a train of pulses generated by a random pulse generator is varied by applying range selection, or control, signals to the random pulse generator so that only noise signals having amplitudes in a predetermined range combine with pulses from the pulse source to produce pulses at the output.

In the best embodiment of the invention a clock pulse source is employed for generating randomly occurring synchronous pulses, that is, pulses that occur only at predetermined times. In this invention several such random pulse generators are controlled by a single clock pulse source, so that whatever pulses are generated in the respective random pulse generators occur only at such predetermined times.

The average rate at which the pulse are generated in the input trains of pulses may be measured by means of a pulse rate meter or they may be determined by counting the number of pulses that occur in a predetermined time interval. The same applies to the output train of pulses.

To produce a train of randomly occurring pulses, electrical pulses from a clock pulse source and electric signals of variable amplitude from a noise source are applied to input legs of an AND gate. With this arrangement the signals appear in the output of the AND gate only in synchronism with the clock pulses. Their respective amplitudes however depend upon the magnitudes of the noise signals that are applied to the input of the AND gate simultaneously with the clock pulses. Amplitudes of the pulses appearing in the output thus vary over a wide range. In this invention a range selector circuit is employed to suppress all pulses except those occurring in a predetermined amplitude range. Since the amplitudes occur randomly, this then means that the selected pulses occur randomly in time. These randomly occurring pulses are fed to a single shot multivibrator, sometimes called a univibrator, in order to produce a sequence of randomly occurring pulses of uniform amplitude and shape.

Various types of mathematical operations can be performed with such trains of randomly occurring pulses. For example, by applying two trains of such random pulse generators to input legs of an AND gate, an output train of randomly occurring pulses is produced. The average frequency of the output train of pulses is proportional to the product of the average frequencies of the two input trains of pulses. Likewise by applying two trains of randomly occurring pulses to the input legs of an OR gate, an output train of randomly occurring pulses can be produced which has an average frequency that is proportional to the sum of the average frequencies of the input trains, so long as those input signals have an average rate which is small compared with the rate of the clock pulse source.

The devices of this invention are particularly adapted to the processing of numbers that lie in a range between 0 to 1, such as numbers that represent values of probability. In case it is desired to process numbers that lie outside such range, they are first normalized to bring them within that range and the average frequency of the output is corrected accordingly.

The foregoing and other features of the invention will be understood by reference to the following descriptions taken in connection with the accompanying drawings wherein.

Figure 1:
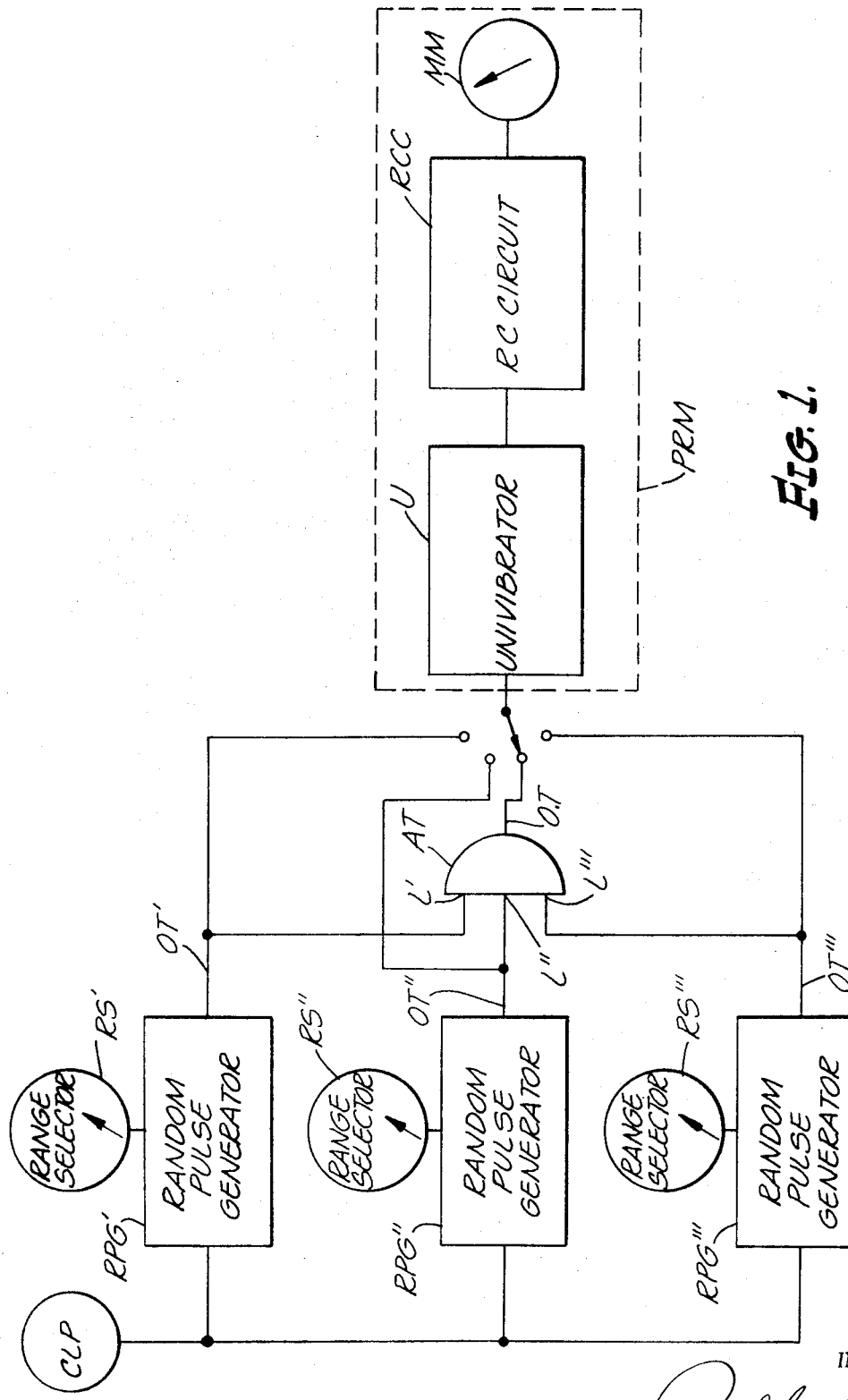
FIG. 1 is a block diagram of multipliers employing this invention.

In FIG. 1 there is shown a multiplier in which pulses occurring randomly at predetermined times are employed to accomplish the arithmetic operation of multiplication. A common clock pulse source CLP is employed to cause pulses to appear at the outputs OT', OT'', and OT''' of three random pulse generators RPG', RPG'', and RPG''' only at times when pulses are being generated by the clock pulse source. Each of the random pulse generators RPG', RPG'', and RPG''' has associated therewith a range selector RS', RS'', and RS''' respectively for causing the pulses to appear in the respective outputs OT', OT'', and OT''' at average rates that are proportional to three numbers N', N'', and N''' that are to be multiplied together. The values of the numbers N', N'', and N''', may be varied by adjusting the range selectors RS', RS'', and RS'''.

The three trains of pulses appearing at the outputs of the respective random pulse generators RPG', RPG'', and RPG''' are applied to the input legs L', L'', and L''' respectively of an AND gate AT.

In this case, a single pulse rate meter PRM is arranged to be selectively connectable to the output of any of the random pulse generators and the multiplying AND gate.

When the pulse rate meter PRM is connected to the output of any of these units, it indicates the average rate at which pulses occur in the train of pulses appearing in the output of that unit. If desired, four separate pulse rate meters may be employed to facilitate simultaneous measurement of the average pulse rates in the four pulse trains.

The pulse rate member PRM may be in the form of a pulse counter of a well known kind which counts the total number of pulses applied thereto during a predetermined time interval. The number of pulses counted, divided by the time interval is the average pulse rate over that interval. Alternatively, the pulse rate meter may be of a kind which employs an RC circuit to produce a DC signal representative of the average rate of application of pulses thereto over a time interval of the order of the time constant RC. In either event, the accuracy of the average rate increases with the value of the time interval or with the value of the time constant RC as the case may be.

The system illustrated in FIG. 1 is particularly suitable for use where the pulse rate meter PRM is in the form of a counter which counts the total number of pulses supplied thereto in a predetermined time interval. In such a device the accuracy of the output does not depend upon uniformity of the amplitude and duration of the pulses in the pulse trains generated by the random pulse generators RPG', RPG'', and RPG'''. However, pulse rate meters may be employed. The accuracy of such meters depends upon the uniformity of the size and shape of the pulses. Where the pulses are of uniform size and shape, a single RC pulse rate meter may be employed. If the pulses vary in size or shape or both, a multivibrator is included within the pulse rate meter to convert each incoming pulse into a pulse of standard size and shape.

Such a pulse rate meter PRM of the RC type includes a univibrator U, an RC circuit RCC, and a milliammeter MM. The univibrator U is triggered by a pulse applied to its input to produce a pulse of uniform amplitude and duration at its output. Such pulses are applied to the RC circuit RCC to develop a current in its output which is proportional to the average frequency of the pulses. This current is measured by the milliammeter MM to indicate the average frequency of occurrence of pulses applied to the input of the pulse rate meter PRM.

It can be shown that the average pulse rate in the output of the AND gate AT is the arithmetic product of the average rate at which pulses are applied to the three input legs of the AND gate. Thus, the circuit described performs the arithmetic operation of multiplication.

By way of further explanation, let the average frequency of occurrence of pulses in the output of the first random pulse generator RPG' be $R'$. Similarly, let the average frequency of occurrence of pulses in the output of the second random pulse generator RPG'' be $R''$. Likewise, let the average frequency of occurrence of pulses in the output of the third random pulse generator RPG''' be $R'''$. Then if $R$ is the average frequency of pulses appearing in the output of the AND gate we have $$R = R'R''R'''$$

The value of each frequency $R$, $R'$, $R''$, and $R'''$ is expressed as a decimal fraction of the frequency F of pulses supplied by the clock pulse source. Thus, for example, if $R' = 0.80F$, $R'' = 0.60F$, and $R''' = 0.50F$, then $R = 0.24F$.

Figure 2:
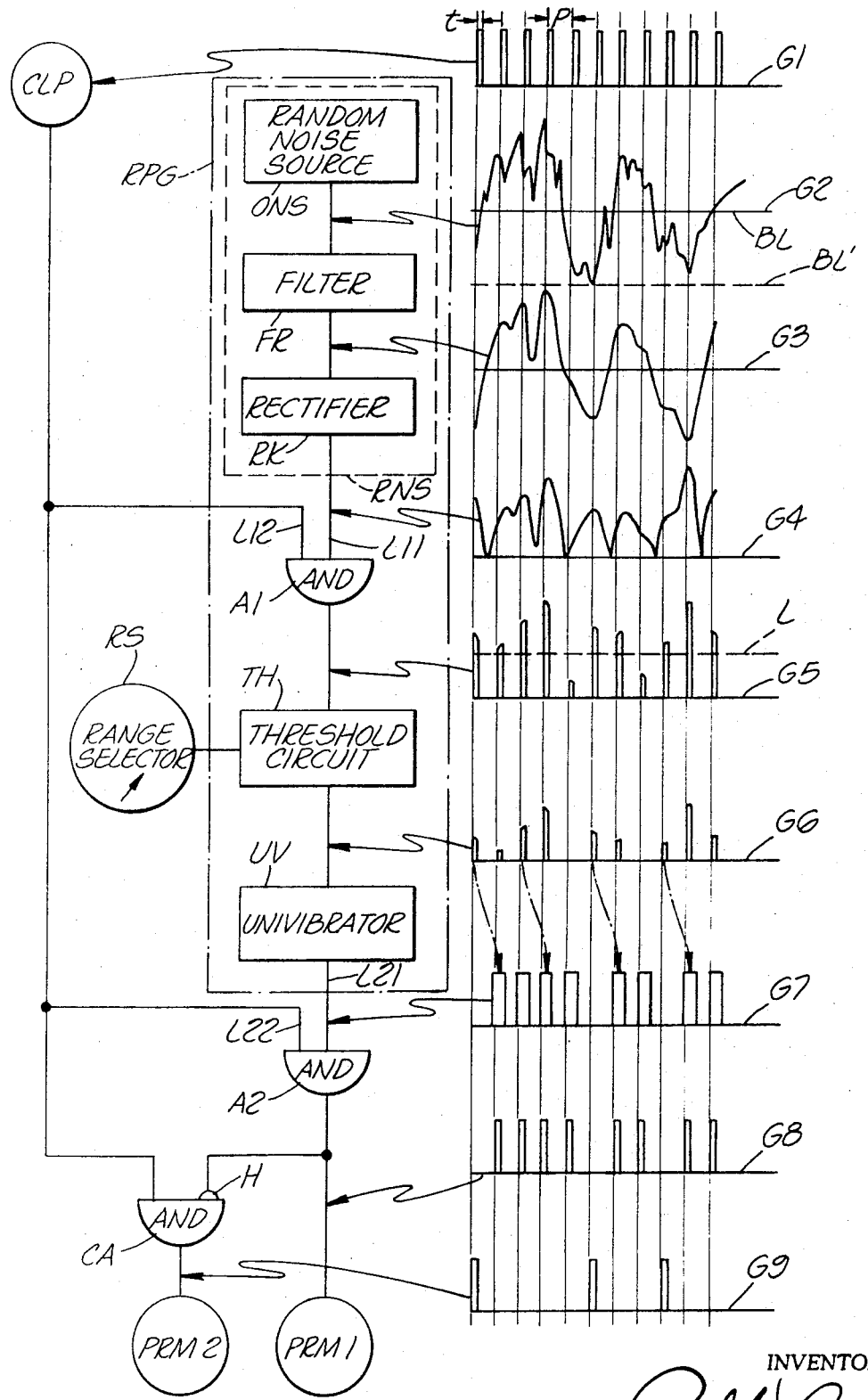
FIG. 2 is a more detailed block diagram of a random pulse generator employing this invention.

A more detailed showing of a random pulse generator is represented in FIG. 2. The operation of this random pulse generator is explained with reference to a series of time-coordinated graphs G1 to G9. In these graphs, ordinates represent signal amplitude and abscissa represents time, later times appearing on the graphs to the right of earlier times.

This random pulse generator employs a clock pulse source CLP which supplies electrical pulses of uniform size and shape at uniform intervals. The nature of the pulses supplied by the random clock pulse source CLP is represented in graph G1. Each of the pulses is a "square wave" having a duration $t$ which is small compared with the period P elapsed between the inception of successive pulses. The particular clock pulse source was one which produces square waves at a frequency ($F$) of about 5,000 pulses per second. Pulses occurred at intervals of about 200 $\mu$sec. Each of the pulses had a magnitude of about 10 volts and a duration less than about 20 $\mu$sec. These values could be adjusted as needed.

In this random pulse generator an original random noise source ONS is employed to aid in the generation of a train of randomly occurring pulses. Such a random noise source may be in the form of a vacuum tube, a semiconductor diode, or a noisy amplifier. In the best embodiment of the invention the original noise source ONS produces a noisy signal that contains components of random amplitude and random frequency. Described differently, the amplitude of the output of the noise source varies rapidly in a random manner. The noise may be "white" over a broad band of frequencies that includes the frequency of the clock pulse source CLP.

The signal appearing in the original noise source ONS may be uni-directional or bi-directional, depending upon the exact nature of the circuitry. A noise signal from a noise source has been represented in graph G2. In this graph as in others, amplitudes represent voltage. Where the signal is bi-directional, 0 voltage is indicated by the heavy base line BL. But where the signal is uni-directional, 0 voltage is represented by the dashed base line BL' that lies to one side of the graph.

In this form of the invention the signals from the original noise source ONS are transmitted through an electric filter FR of the broad band-pass type. The transmission band of this filter includes frequencies corresponding to the frequency of occurrence of the clock pulses CLP. The filter FR attenuates signals of very low frequency compared with the frequency of the clock pulse source CLP. It also attenuates signals of very high frequencies so as to remove a large portion of any pulses or spikes that have a duration that is short compared with the duration $t$ of the pulses supplied by the clock pulse source. The output of the filter FR is somewhat smoother than the output of the random noise source RNS as indicated by graph G3. Where the signal is bi-directional, a full-wave rectifier RK may be employed in order to assure that there shall be no extended intervals of silence. The output of such a full-wave rectifier is represented in graph G4. In practice, as will appear hereinafter, the filter FR may be a high-pass filter and a full-wave rectifier RK need not be employed. More particularly no such rectifier is needed if the noise has components that have frequencies that cover a band that includes frequencies of the order of the clock frequency, both below and above clock frequency. The original noise source, the filter, the rectifier (if any), and also any amplifier present here constitute a random noise source RNS.

The random noise from the random noise source RNS is applied to one leg L11 of an AND gate A1 and pulses from the clock pulse source CLP are applied to another leg L12 of that AND gate. The amplitude of the signals from the clock pulse source is equal to the full amplitude range of the AND gate. The signals from the random noise source are of variable amplitude. As a result, a first train of discrete pulses of variable amplitude is generated in the output of the AND gate A1. These pulses all have the same duration $t$ but their amplitudes are random as indicated in graph G5.

In the system shown, a threshold circuit TH is employed to selectively eliminate pulses having an amplitude below a predetermined level L. This level is made adjustable by manipulation of the range selector RS. By virtue of the action of the threshold circuit, a reduced number of the pulses appear in the output thereof, forming a second train of pulses. However, these pulses are also of variable amplitude as indicated in graph G6. These pulses are supplied to a univibrator, sometimes called a single-shot multivibrator, UV. Each time a pulse above a very low threshold is applied to its input, the univibrator UV produces at its output a pulse of predetermined amplitude and predetermined duration. The train of pulses appearing in the output of the univibrator UV constitutes a third train which may be further processed.

The pulses generated by the univibrator UV have a duration greater than the duration $t$ of the pulses from the clock pulse CLP and they occur at a time that overlaps the occurrence of the clock pulses. In the circuit shown this overlap is obtained by the use of a delay multivibrator that delays the output of the univibrator by a time slightly less than the period T. However, as will appear hereinafter such delay is not always necessary.

Pulses from the clock pulse source and pulses from the univibrator UV are applied to input legs L21 and L22 of another pulse shaping AND gate A2 in order to produce a random series of pulses of standard amplitude and having a duration $t$ equal to that of the pulses from the clock pulse source CLP. The output of the AND gate A2 is applied to a pulse rate meter PRM1 to measure the average frequency of occurrence of pulses in the pulse train appearing there.

Pulses that occur at a complimentary rate are produced by feeding the output of the AND gate A2 through an inhibitor H to one leg of an auxiliary AND gate CA while applying pulses from the clock pulse source CLP to another leg of that AND gate. In this case pulses appear at the output of the complimenting AND gate CA, as indicated in graph G9, only when pulses do not appear in the output of the AND gate A2. The value of the compliment is indicated by means of a pulse rate meter PRM2. The sum of the two rates indicated by the two pulse rate meters PRM1 and PRM2 is constant and is equal to 1.0 where the frequency of pulses generated by the clock pulse source CLP is assigned a value of 1.0.

Figure 3:
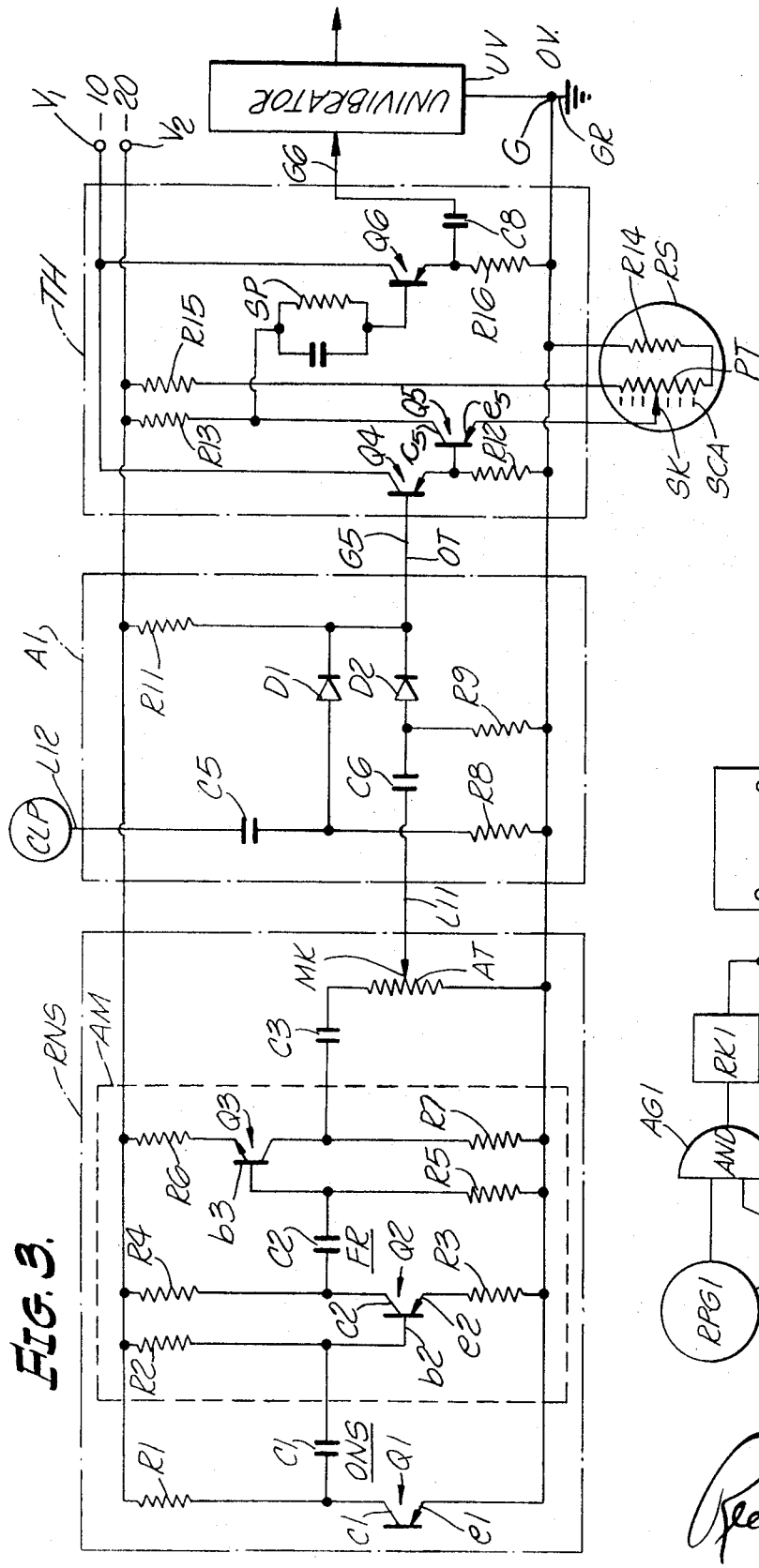
FIG. 3 is a wiring diagram of a random pulse generator embodying the invention.

A detailed schematic diagram of parts of a circuit employed in the practice of this invention is illustrated in FIG. 3. This circuit includes a random noise source RNS, a clock pulse source CLP, an AND gate A1, and a threshold control circuit TH. The random noise source RNS includes an original noise source ONS, an amplifier AM including a filter FR, and a noise signal attenuator AT. The noise source ONS, the filter FR, the clock pulse source CLP, the AND gate A1, and the threshold control circuit TH correspond to units of the same names in FIG. 3. No full-wave rectifier RK is employed.

The original noise source ONS includes a diode Q1 which supplies noise through a capacitor C1 to an amplifier A the output of which is supplied through an attenuator AT to the input leg L11 of the AND gate A1. Pulses from the clock pulse source CLP are applied to the other input leg L12 of the AND gate. The output of the AND gate is applied to the threshold circuit TH which produces at its output pulses that are supplied to a univibrator UV.

This circuit has three voltage terminals G, $V_1$, and $V_2$. Voltages of 0, −10, and −20 volts respectively are supplied to voltage terminals GR, $V_1$, and $V_2$ from a regulated voltage supply (not shown).

The original noise source ONS is in the form of a diode Q1 which is formed between the emitter $e$, and the collector $c1$ of a transistor of the 2N107 type. The diode is connected in the forward direction through a ballast resistor R1 of 22 kilohms to voltage terminal $V_2$. The diode is overloaded, drawing a current of about 1 milliampere, causing the voltage across the diode to be very noisy. The amplifier AM has two amplifying stages comprising transistors Q2 and Q3 respectively. The input transistor Q2 was of type 2N1124 while the output transistor Q3 was of type 2N35. Noise originating in the transistor Q1 is transmitted through a capacitor C1 of 0.01 $\mu f$ to the base $b2$ of an input transistor Q2 of the amplifier AM.

The base $b2$ is connected to the voltage terminal $V_2$ through a resistor R2 having a value of 4.7 megohms. The emitter and collector of the input transistor Q2 are connected to ground GR and to the voltage terminal $V_2$ respectively through resistors R3 and R4 having values of 100 ohms and 18,000 ohms respectively. An amplified noise signal appearing at the collector $c2$ is applied through a coupling capacitor C2 to the base $b3$ of the output transistor Q3. This base $b3$ is connected to ground GR through a resistor R5 having a value of 1 megohm. The collector and emitter of the output transistor Q3 are connected to the negative terminal $V_2$ and to ground through resistors of R6 and R7 of 1,000 ohms and 12,000 ohms respectively.

With this circuit a random noise signal is produced at the output of the amplifier AM having a minimum amplitude of 0 volt and a maximum amplitude of about 10 volts. The amplitude of this signal varies between 0 and 10 volts in a random manner somewhat as indicated in graph G2 of FIG. 3 with an offset base line BL′.

The signal appearing at the collector of the noise diode Q1 is unidirectional in character. Transmission of this signal through the capacitor C1 and the various stages of the amplifier AM causes the signal to pass through bi-directional and unidirectional conditions alternately. But this change of condition of the signal is not detrimental, since ultimately the signal appearing at the contact MK of the attenuator, or volume control, AT has the desired noisy character and includes a wide range of frequency components, including components having frequencies on both sides of the frequency of the signal supplied by the clock pulse source CLP. The signal appearing at the output of the amplifier AM is applied through a capacitor C3 of $0.001 \mu F$ to a 15,000 ohm volume control AT which acts as an attenuator.

The various circuit elements of the amplifier and attenuator circuit act as a band-pass filter, preventing noise components of very low frequency and very high frequency from reaching the output of the amplifier AM. Low frequency components of the noise were attenuated in part by means of the high-pass filter FR provided by the capacitor C3 and resistor R5. The filtering out of high frequency components is provided by the inherent characteristics of the circuit. For this reason, no special provisions need be made to eliminate the very high frequency components of the noise.

The AND gate A1 is of a simple two-leg diode type. It employs two diodes D1 and D2 having their cathodes connected through a 100,000 ohm resistor R11 to the voltage terminal $V_2$ and their anodes respectively connected to ground GR through 30,000 ohm resistors R8 and R9 respectively. The junction between the anode of diode D1 and resistor R8 is connected through a capacitor C5 to the clock pulse source CLP. The junction between the anode of diode D2 and resistor R9 is connected through a capacitor C6 to the movable contact MK of the attenuator AT. The two capacitors C5 and C6 may have values of capacitance of $0.1 \mu F$ each.

The threshold control circuit utilizes an input transistor Q4, a threshold-sensitive amplifying transistor Q5, and an output transistor Q6. Both the input and output transistors Q4 and Q6 are connected as emitter followers. The transistors Q4, Q5, and Q6 are all of the type known as 2N241A.

Signals appearing at the output of the AND gate A1 are applied to the base of the emitter-follower transistor Q4, being reproduced across the emitter resistor R12. The signal appearing across this resistor is applied to the base of the amplifying transistor Q5. The cathode C5 of this resistor Q5 is connected to a 15,000 ohm resistor R13 to the voltage terminal $V_2$.

The collectors of the input and output transistors Q4 and Q6 are connected to the terminal $V_1$. The emitter e5 of the transistor Q5 is connected to a sliding contact SK of a 500 ohm potentiometer PT, one end of which is connected to ground through 270 ohm resistor R14 and the other end of which is connected to the second voltage terminal $V_2$ through a 1,500 ohm resistor R15. The collector of the transistor Q5 is connected through a speed-up or lead circuit SP to the base of the output transistor Q6. The lead circuit comprises a resistor of 180 kilohms connected in parallel with a $100 \mu\mu F$ capacitor. The emitter of the output transistor Q6 is connected to ground through a 1,800 ohm resistor R1. With the particular resistance values of resistors R14, R15, and the particular resistance value of the potentiometer PT, the pulse rate of the train of random pulses appearing at the output of the threshold circuit TH could be varied from 0 to 1.0. These pulses are applied through a coupling capacitor C8 of $0.0027 \mu F$ to a single-shot multivibrator of the type that responds without delay to the incoming signals. The univibrator produces pulses having a duration somewhat longer than those generated by the clock pulse source but still short compared with 200 $\mu$sec., the period P of the clock pulses. With this circuit, pulses appear at the output of the univibrator UV simultaneously with the appearance of pulses at the output of the threshold circuits. In order to produce accurate multiplication with a clock pulse source of such low frequency, a pulse rate meter was employed which had a time constant of the order of seconds.

The potentiometer PT may be calibrated by means of a scale SCA opposite the pointer SK in terms of the average rate at which pulses appear at the output OT of the AND gate A1.

In practice the values of the resistors R14 and R15 were established at values suitable for making the pulse rate of the random pulse generator of FIG. 3 a linear function of the position of the pointer SK on a linear scale. In particular, the values were so selected that when the pointer SK was at one end of the potentiometer the reading of the scale SCA was 100 and at the other end it was 0. For this purpose a linear potentiometer PT is employed and the values of the resistors R14 and R15 are adjusted to give correct readings at two intermediate points of the scale. In this way, linearity is attained with a high degree of accuracy throughout a wide range.

Alternatively, the average rate at which pulses appear at the output of a random pulse generator RPG may be indicated by a pulse rate meter connected to the output such as the pulse rate meter PRM1 of FIG. 2.

The circuit shown in FIG. 3 constitutes a random pulse generator RPG of a type that may be employed in the multiplier of FIG. 1. In the operation of FIG. 3 the signals appearing in the output of the random noise source RNS have a noisy character such as that represented by graph G3 of FIG. 2. Likewise, the pulses appearing in the output of the AND gate A1 form a first train of pulses like those represented in graph G5 of FIG. 2. The train of pulses appearing in the output of the threshold circuit TH form a second train of pulses like that represented by graph G6 of FIG. 3. And the pulses appearing in the output of the univibrator UV of FIG. 3 correspond to those represented by graph G7 of FIG. 2. This train of pulses is employed as an input train for one of the legs of the AND gate of FIG. 1. Alternatively, trains of pulses represented in graphs G8 or G9 could be employed for this purpose.

When three random pulse generators, including univibrators, of the type described in connection with FIG. 3 are connected to an AND gate, accurate multiplication was achieved.

Though the invention has been described in detail only with respect to the operation of multiplication, it will be understood that it may be applied to other mathematical operations. Thus, for example, if two random pulse generators are connected to the input of an OR gate then the rate at which pulses appear in the output will be $R = R' + R'' - 2R'R''$.

Figure 4:
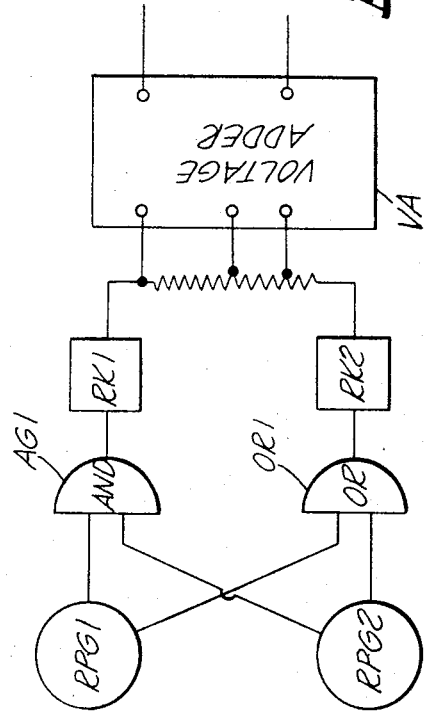
FIG. 4 is a block diagram of a form of the invention which produces the sum of two members with a high degree of accuracy.

So long as the values of $R'$ and $R''$ are small, the term $R'R''$ may be neglected. But if it is large, account must be taken of this fact if accuracy is to be attained. This may be done, for example, with a circuit of the type illustrated in FIG. 4. In this adding unit, the output of a first random pulse generator RPG1 is fed to a leg of AND gate AG1 and to a leg of an OR gate OR1 and the output of a second random pulse generator RPG2 is fed to another leg of the AND gate AG1 and another leg of the OR gate OR1. In this case the output of each of these gates is rectified by rectifiers RK1 and RK2. The outputs of the two rectifiers RK1 and RK2 are fed to a voltage adder in the proportions of 2 to 1 thus producing a signal in the output which represents the sum of the signals represented by the random pulse trains supplied by the generators RPG1 and RPG2, even when these rates are not small.

In the operation of the computing system described herein, the AND gate and the OR gate operate in accordance with laws of Boolean logic upon the randomly occurring pulses, thereby achieving operations of an arithmetic character with the multiplier of FIG. 1. For example, the AND gate AP takes the logical product of the pulses applied to its input. Thus a pulse appears at the output only when a pulse is applied to all the input legs. As a result, a train of pulses is produced at the output which has an average frequency which is the arithmetic or numerical product of the average frequency of the trains of pulses supplied by the three random pulse generators RPG', RPG'', RPG'''.

It is thus seen that a random pulse generator has been provided which may be employed to generate trains of pulses that occur randomly at an average frequency that may be varied at will, and that input trains of such randomly occurring pulses may be employed in various ways to produce a train of randomly occurring pulses in which the average frequency of the pulses is mathematically related in a predetermined manner to the average frequency of the pulses in the input trains. It is to be understood, of course, that the invention may be modified in many ways without departing from the scope of the appended claims. In particular it is to be understood that the invention is not limited to the specific embodiments thereof disclosed, or to the specific numerical values of elements employed in the embodiments described. Furthermore, many other types of components may be employed to practice the invention in place of those which have been specifically described.

I claim:

1. In a random pulse generator, the combination of:
   a source of clock pulses that occur successively at regular intervals,
   a source of successively occurring noise signals of variable amplitude,
   and means controlled by pulses from said two sources for producing a series of randomly occurring output pulses, each of which latter pulses occurs only when the amplitude of the noise signal lies in a predetermined range during the occurrence of a clock pulse.

2. In a random pulse generator as defined in claim 1 wherein said output pulses have different amplitudes depending upon the amplitudes of the noise signals, and comprising means for producing output pulses only when the amplitude of said noise signals lies above a predetermined level.

3. In a random pulse generator as defined in claim 1 wherein said means comprises an AND gate having input terminals to which pulses from said two sources are fed respectively whereby said output pulses have different amplitudes depending upon the amplitudes of the noise signals, and
   a threshold circuit connected to the output of said AND gate for producing output pulses only when the amplitude of said the first mentioned output pulses lies above a predetermined threshold.

4. In a random pulse generator defined in claim 3:
   a single-shot multivibrator connected to said threshold circuit for producing an output pulse of predetermined shape in response to each of the pulses occurring in the output of the threshold circuit.

5. In a random pulse generator defined in claim 4:
   means including an AND gate and an inverter connected to said threshold circuit and to said clock pulse source for producing a train of pulses complementary to the train of pulses appearing in the output of the multivibrator.

6. In a random pulse generator as defined in claim 3:
   means for adjusting the threshold established by the threshold circuit whereby the average rate at which pulses occur in the output of the threshold circuit may be varied.

7. In a random pulse generator as defined in claim 5:
   means for adjusting the threshold established by the threshold circuit whereby the average rates at which pulses occur in said two output trains may be varied while the sum of said averages remains constant.

8. A random pulse generator, the combination of
   a source of clock pulses,
   a source of noise signals,
   means controlled by said clock pulse source and said noise source for generating output pulses having randomly different amplitudes but occurring in synchronized relation with said clock pulses,
   means including a transistor having a base, a collector, and an emitter for selectively detecting such random pulses, said last mentioned means including a potentiometer connected to a voltage supply and a slider movable along the length of said potentiometer and connected in circuit with said emitter for adjusting the bias on said emitter thereby selectively generating pulses in the collector circuit in response to said output pulses.

9. A random pulse generator as defined in claim 8 wherein said source of noise signals is an overloaded diode.

10. In a random pulse generator, the combination of:
    a source of clock pulses that occur successively at regular intervals,
    a source of successively occurring noise signals in which parts of the signal that exceed a specific amplitude occur at irregular intervals,
    and means controlled by said clock pulses and by said parts of said noise signals for producing a series of output pulses at random intervals but in synchronism with said clock pulses.

11. In a random pulse generator as defined in claim 10 wherein said means comprises an AND gate having input terminals to which pulses from said two sources are fed respectively whereby said output pulses have different amplitudes depending upon the amplitudes of the noise signals, and
    a threshold circuit connected to the output of said AND gate for producing output pulses only when the amplitude of the first mentioned output pulses lies above a predetermined threshold.

12. In a random pulse generator defined in claim 11:

a single-shot multivibrator connected to said threshold circuit for producing an output pulse of predetermined shape in response to each of the pulses occurring in the output of the threshold circuit.

13. In a random pulse generator defined in claim 12:
means including an AND gate and an inverter connected to said threshold circuit and to said clock pulse source for producing a train of pulses complementary to the train of pulses appearing in the output of the multivibrator.

14. In a random pulse generator as defined in claim 11:
means for adjusting the threshold established by the threshold circuit whereby the average rate at which pulses occur in the output of the threshold circuit may be varied.

15. In a random pulse generator as defined in claim 13:
means for adjusting the threshold established by the threshold circuit whereby the average rates at which pulses occur in said two output trains may be varied while the sum of said averages remains constant.

* * * * *